(12) United States Patent
Hanya et al.

(10) Patent No.: US 9,042,056 B2
(45) Date of Patent: May 26, 2015

(54) DISK DRIVE SUSPENSION WITH MICROACTUATOR ELEMENTS ON RESPECTIVE SLIDER SIDES AND DAMPER MEMBER ON GIMBAL PORTION AWAY FROM DIMPLE

(71) Applicant: NHK SPRING CO., LTD., Yokohama-shi, Kanagawa (JP)

(72) Inventors: Masao Hanya, Aiko-gun (JP); Kenichi Takikawa, Aiko-gun (JP); Toshiki Ando, Aiko-gun (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/036,502

(22) Filed: Sep. 25, 2013

(65) Prior Publication Data

US 2014/0085754 A1    Mar. 27, 2014

(30) Foreign Application Priority Data

Sep. 27, 2012   (JP) ................................ 2012-214022

(51) Int. Cl.
*G11B 21/10*   (2006.01)
*G11B 5/48*    (2006.01)
*G11B 5/596*   (2006.01)

(52) U.S. Cl.
CPC .............. *G11B 5/4813* (2013.01); *G11B 5/482* (2013.01); *G11B 5/4826* (2013.01)

(58) Field of Classification Search
CPC .... G11B 5/482; G11B 5/4873; G11B 5/6058; G11B 5/4826
USPC ............ 360/294, 294.1, 294.2, 294.3, 294.4, 360/294.5, 294.6, 294.7
See application file for complete search history.

(56) References Cited

U.S. PATENT DOCUMENTS

| | | | |
|---|---|---|---|
| 6,967,821 B2 * | 11/2005 | Himes et al. ............... | 360/245.3 |
| 7,495,178 B2 | 2/2009 | Ishii et al. | |
| 8,218,267 B2 | 7/2012 | Arai et al. | |
| 8,675,314 B1 * | 3/2014 | Bjorstrom et al. .......... | 360/294.3 |

(Continued)

FOREIGN PATENT DOCUMENTS

| | | |
|---|---|---|
| JP | 2007234982 A | 9/2007 |
| JP | 2008287835 A | 11/2008 |
| JP | 2010-146631 A | 7/2010 |
| JP | 2010-218626 A | 9/2010 |

OTHER PUBLICATIONS

Related U.S. Appl. No. 14/036,548; First Named Inventor: Masao Hanya; Title: "Disk Drive Suspension", filed Sep. 25, 2013.

*Primary Examiner* — Craig A. Renner
(74) *Attorney, Agent, or Firm* — Holtz, Holtz, Goodman & Chick PC

(57) ABSTRACT

A slider and microactuator elements are disposed on a gimbal portion of a flexure. A tongue of the gimbal portion has a first tongue portion, a second tongue portion, and a hinge portion. A leading-side portion of the slider is movably disposed on the first tongue portion. A trailing-side portion of the slider is secured to the second tongue portion. The hinge portion is formed between the first tongue portion and the second tongue portion. The gimbal portion is provided with a damper member includes a viscoelastic material layer and a constrained plate. The damper member comprises a first damper and a second damper. The hinge portion is exposed between the first damper and the second damper. A dimple on a load beam contacts the hinge portion at a point of contact.

15 Claims, 18 Drawing Sheets

(56) References Cited

U.S. PATENT DOCUMENTS

| | | |
|---|---|---|
| 2001/0012182 A1* | 8/2001 | Boutaghou et al. ........ 360/245.7 |
| 2003/0202292 A1* | 10/2003 | Arya et al. ................. 360/294.4 |
| 2009/0190260 A1* | 7/2009 | Kobatake ................... 360/244.2 |
| 2010/0238581 A1 | 9/2010 | Nakamura et al. |
| 2011/0096438 A1 | 4/2011 | Takada et al. |
| 2012/0231156 A1 | 9/2012 | Arai et al. |
| 2014/0085755 A1* | 3/2014 | Hanya et al. ............... 360/244.5 |

* cited by examiner

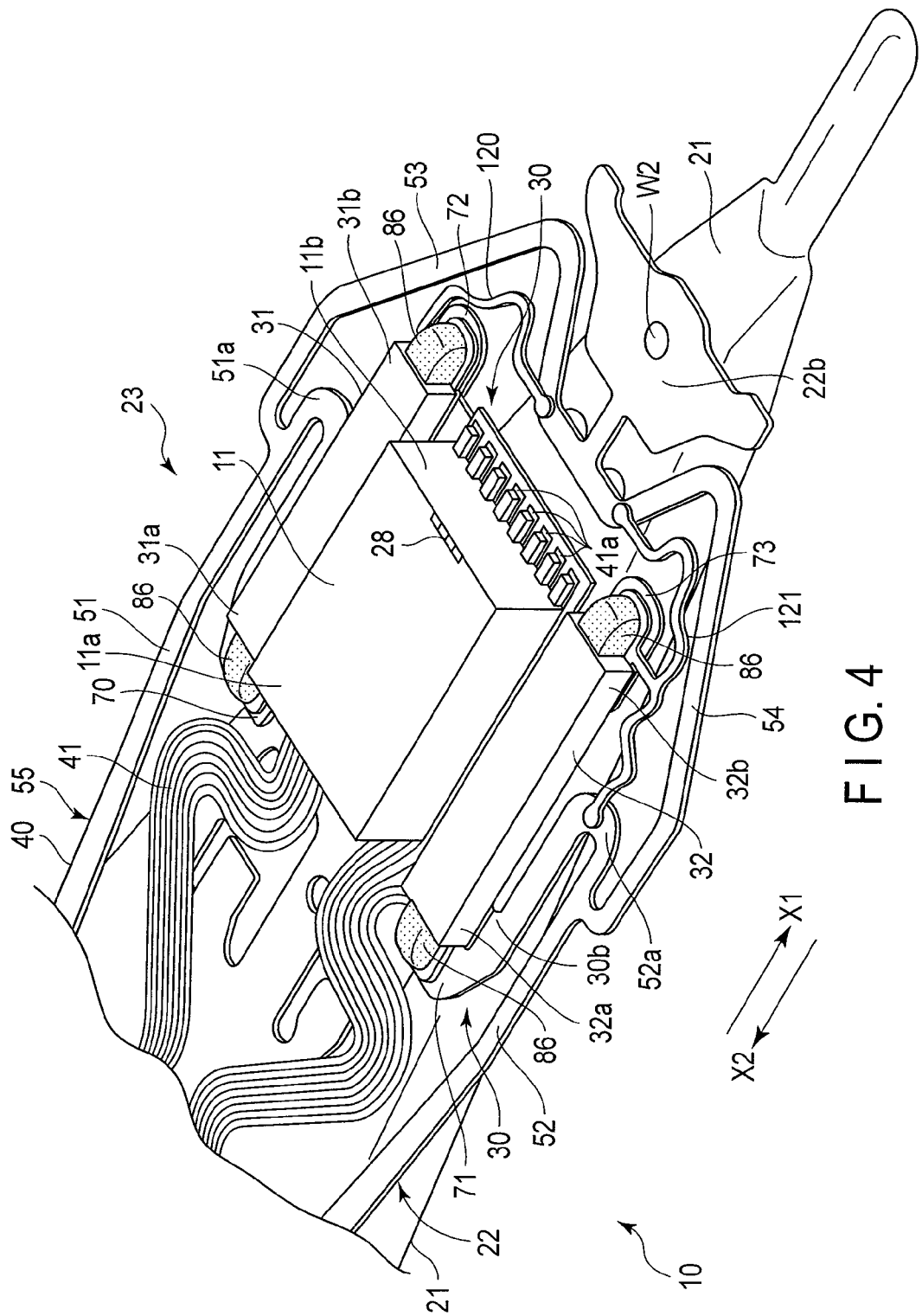
F I G. 4

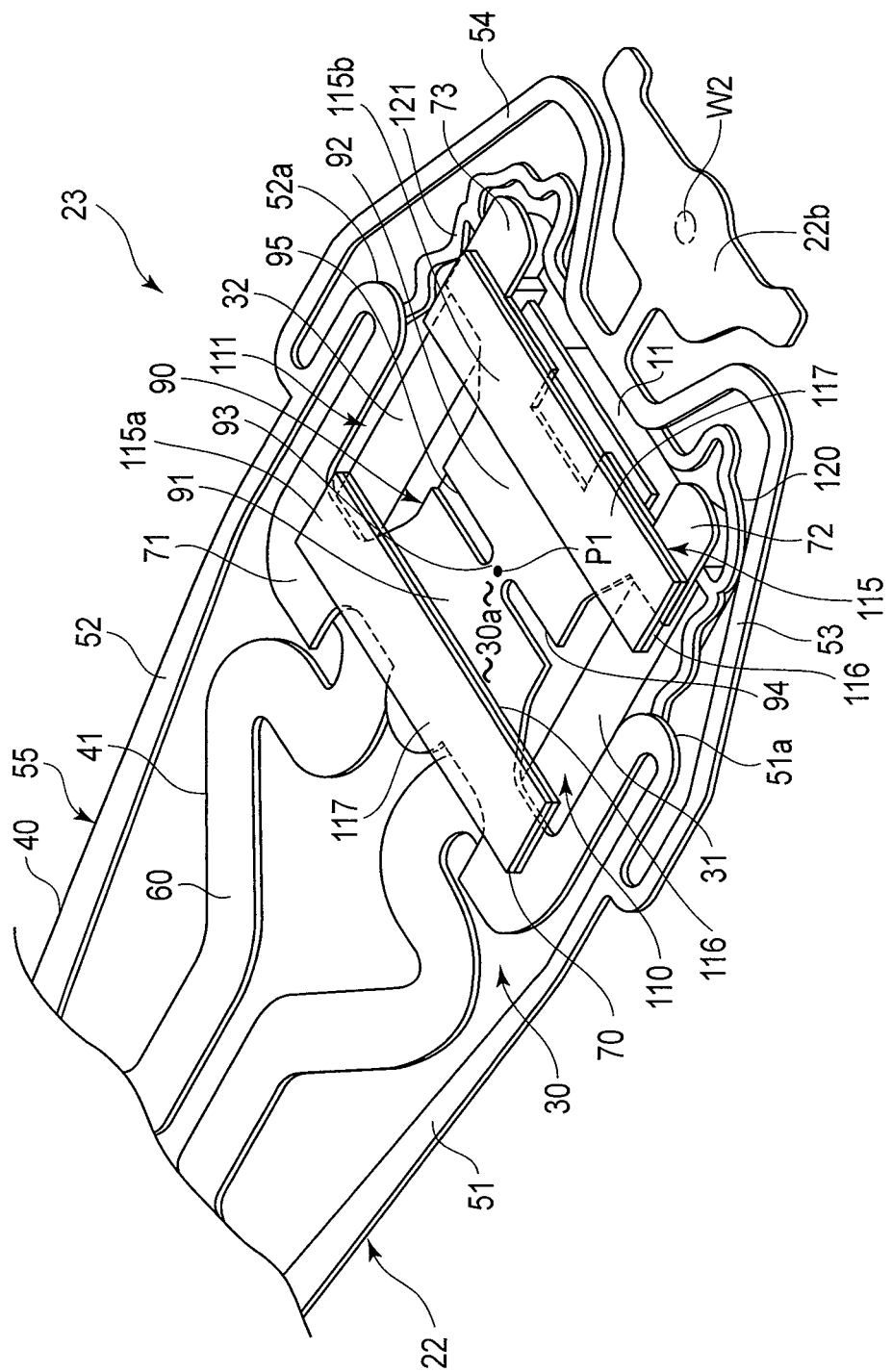
F I G. 5

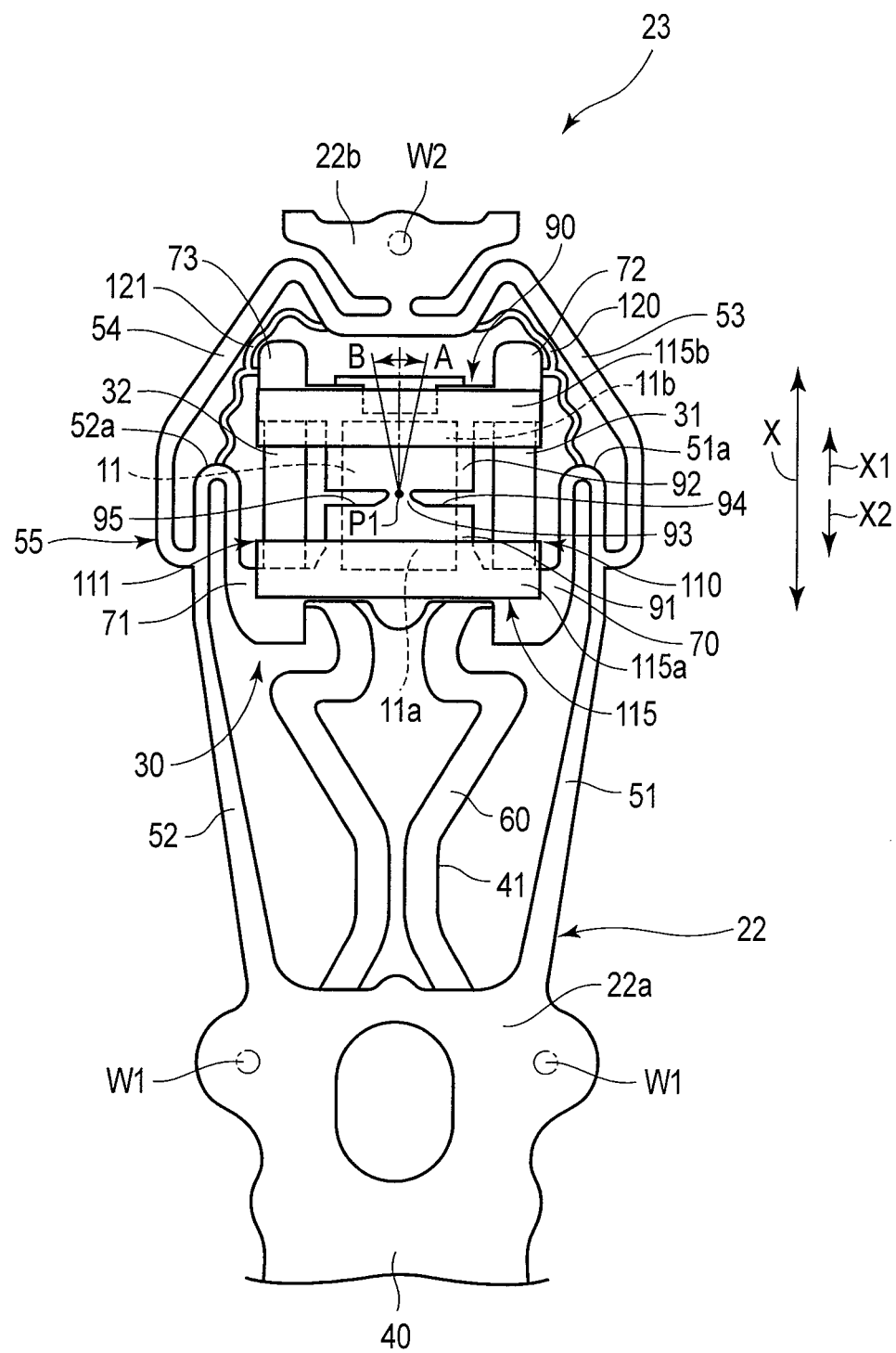
F I G. 6

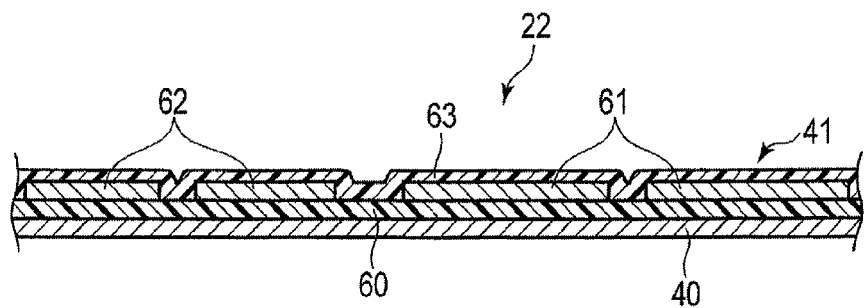
F I G. 8
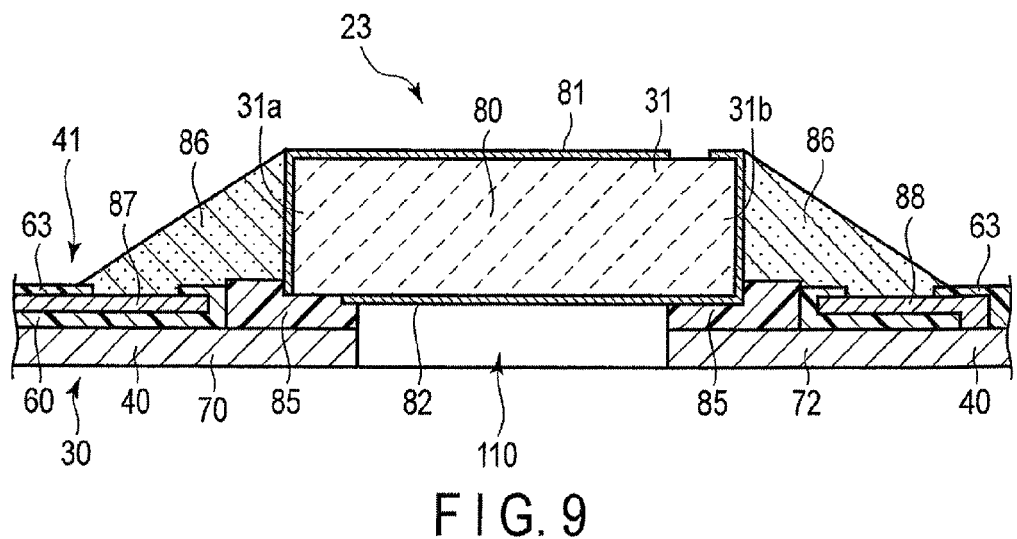
F I G. 9
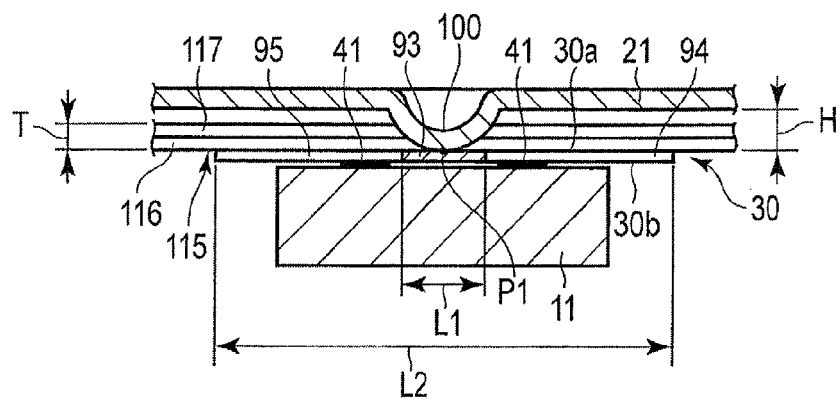
F I G. 10

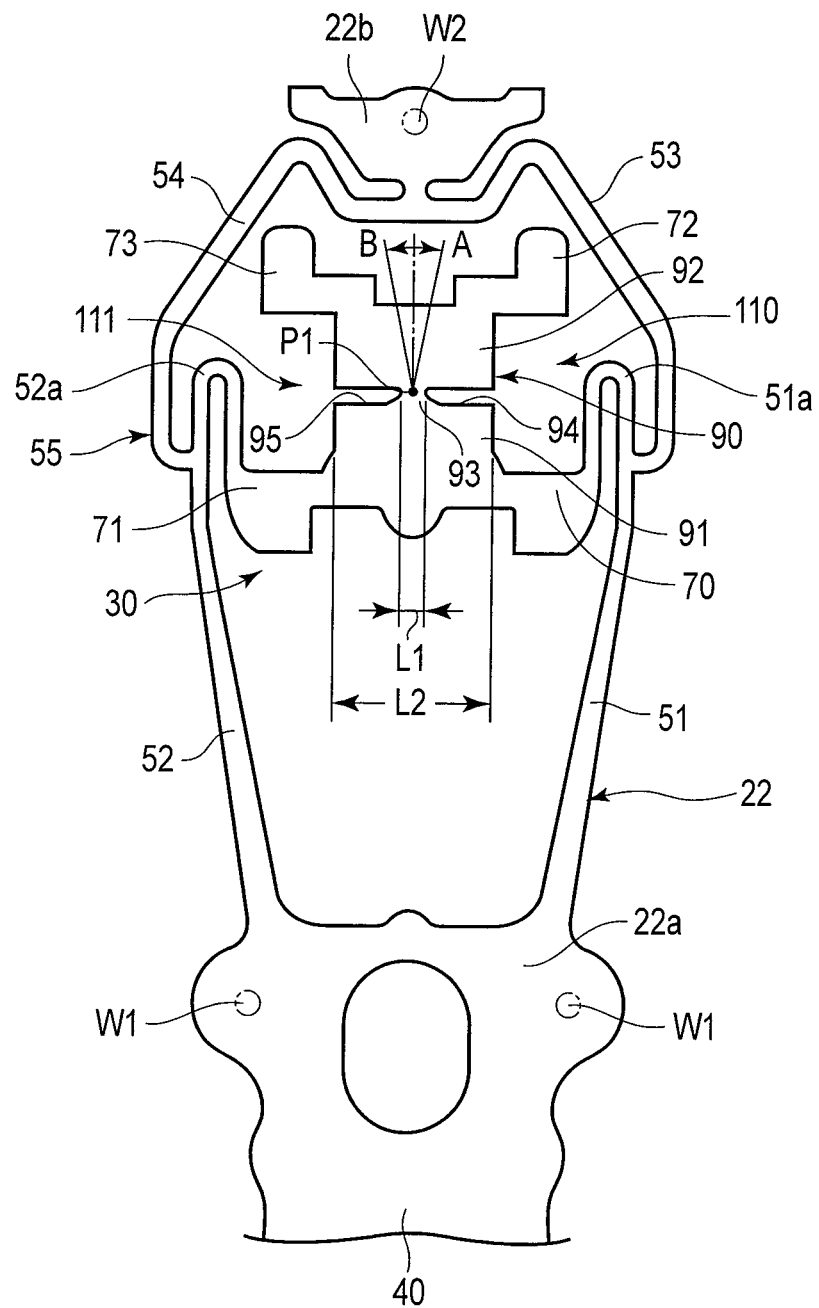
F I G. 11

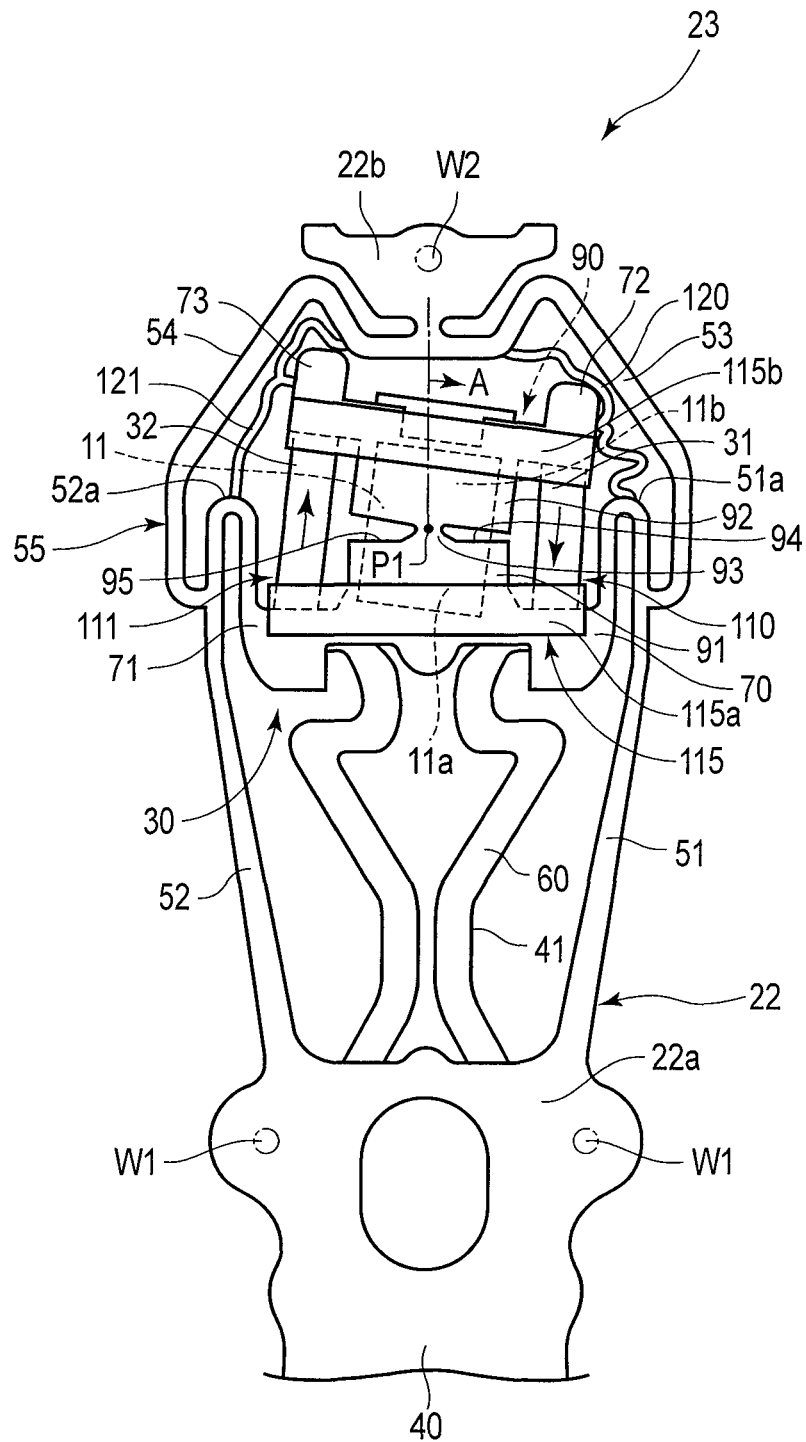
F I G. 12

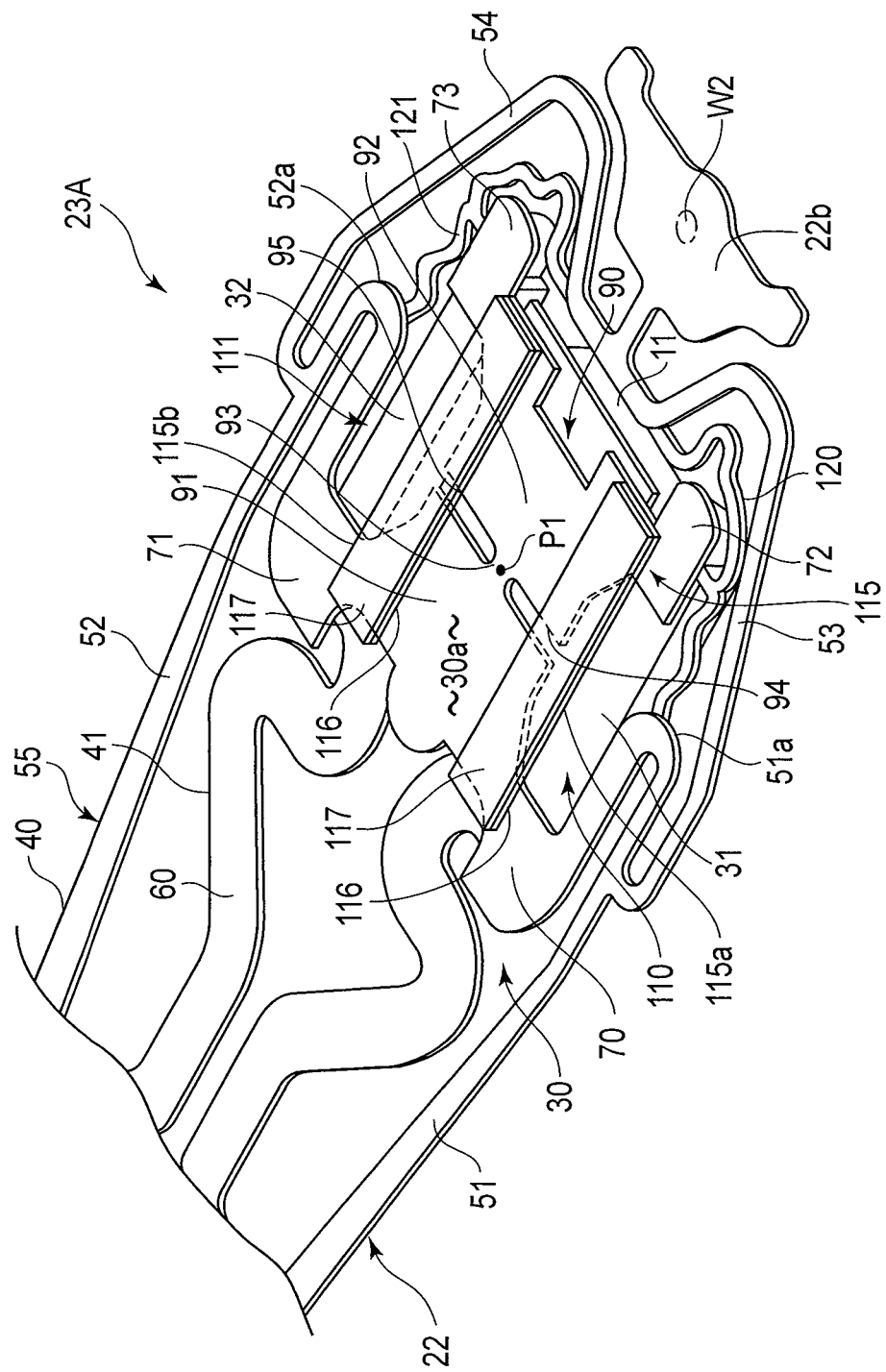
F I G. 13

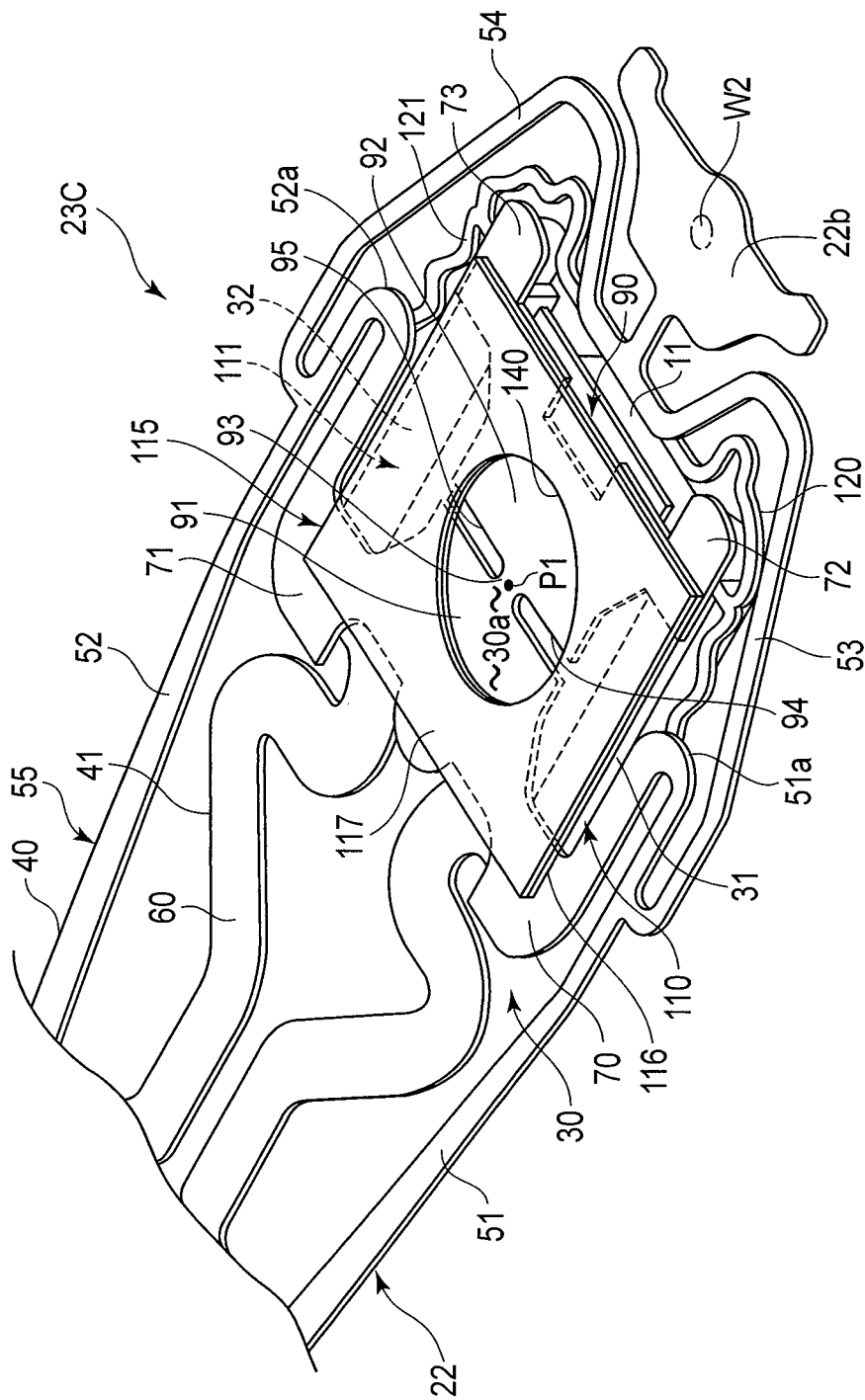
F I G. 15

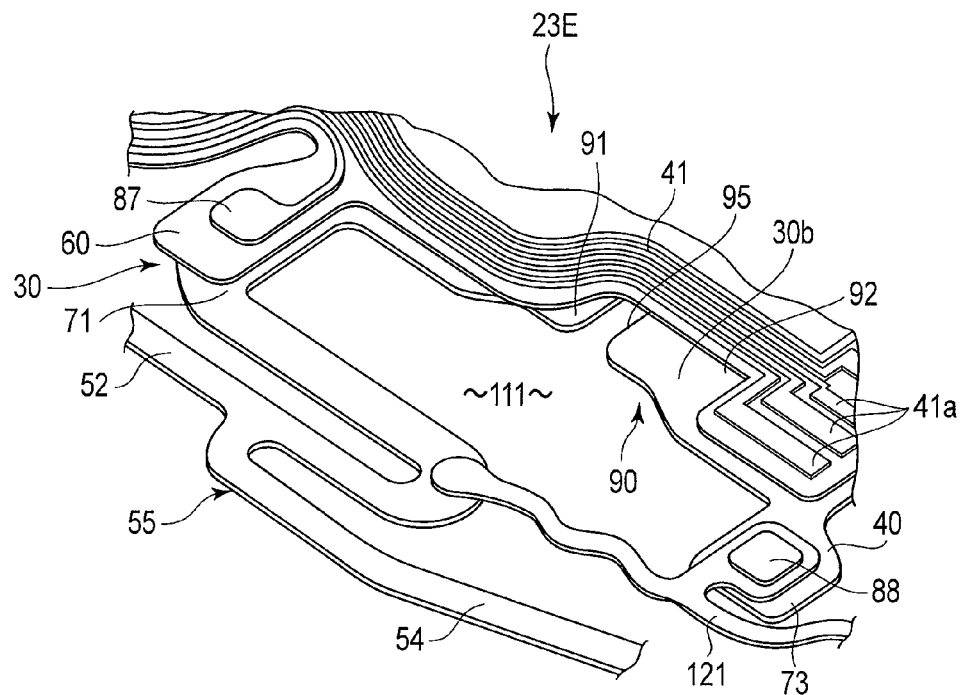
F I G. 19
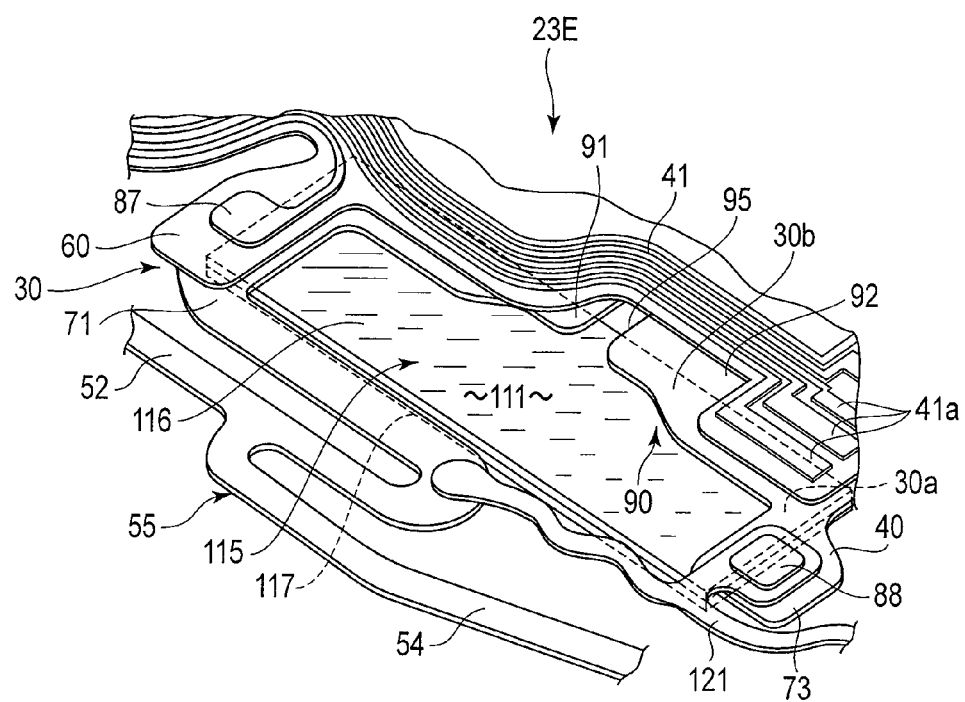
F I G. 20

DISK DRIVE SUSPENSION WITH MICROACTUATOR ELEMENTS ON RESPECTIVE SLIDER SIDES AND DAMPER MEMBER ON GIMBAL PORTION AWAY FROM DIMPLE

CROSS-REFERENCE TO RELATED APPLICATIONS

This application is based upon and claims the benefit of priority from prior Japanese Patent Application No. 2012-214022, filed Sep. 27, 2012, the entire contents of which are incorporated herein by reference.

BACKGROUND OF THE INVENTION

1. Field of the Invention

This invention relates to a disk drive suspension comprising a microactuator element of, for example, lead zirconate titanate (PZT).

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks about the pivot by a positioning motor, such as a voice coil motor.

A suspension is mounted on the actuator arm. The suspension comprises a load beam, flexure superposed thereon, etc. A slider, which constitutes a magnetic head, is mounted on a gimbal portion formed near the distal end of the flexure. The slider is provided with elements (transducers) for accessing data, that is, for reading or writing data. The load beam, flexure, slider, etc., constitute a head gimbal assembly.

In order to overcome the increase in the recording density of disks, the magnetic head should be more precisely positioned relative to the recording surface of each disk. To attain this, dual-stage-actuator (DSA) suspensions have been developed that combine a positioning motor (voice coil motor) and microactuator element made of a piezoelectric material, such as lead zirconate titanate (PZT).

The distal end of the suspension can be quickly moved by an infinitesimal distance in a sway direction (or transversely relative to tracks) by applying a voltage to and thereby deforming the microactuator element. As disclosed in Jpn. Pat. Appln. KOKAI Publications Nos. 2010-146631 (Patent Document 1) and 2010-218626 (Patent Document 2), moreover, there are also known co-located DSA suspensions in which microactuator elements are mounted on a gimbal portion of a flexure.

FIG. 23 shows frequency response characteristics of a conventional co-located DSA suspension with microactuator elements mounted on a gimbal portion. In FIG. 23, full line S1 represents a frequency response characteristic curve obtained when the gimbal portion is swung by driving the microactuator elements (PZT excitation). Dash-dotted line S2 represents a frequency response characteristic curve obtained when a base portion is caused to vibrate by an exciter so that the gimbal portion is swung (baseplate excitation).

In the example of FIG. 23, the gain is increased as a torsional mode based on PZT excitation is coupled with one based on baseplate excitation at point G1 near 12 kHz, point G2 near 17 kHz, etc. There is a possibility of the amplified vibration adversely affecting the properties of the gimbal portion. If the resonance modes based on the PZT and baseplate excitations are coupled in this manner, the increase of the gain by the coupling can be suppressed by reducing the gain of one of the resonance modes by some means.

BRIEF SUMMARY OF THE INVENTION

Accordingly, the object of this invention is to provide a disk drive suspension or co-located DSA suspension in which a slider and microactuator elements are mounted on a gimbal portion such that vibration of the gimbal portion can be suppressed.

A disk drive suspension according to an embodiment comprises a load beam and a flexure comprising a stationary part secured to the load beam and a gimbal portion on which a slider is disposed. The suspension comprises a tongue on which the slider is mounted, microactuator elements disposed on either side of the slider and each comprising a first end portion and a second end portion, a convex dimple formed on one of respective facing surfaces of the load beam and the tongue and configured to contact the other facing surface, thereby supporting the tongue for swinging motion relative to the load beam, and a damper member disposed on the gimbal portion in a position kept away from the dimple.

According to the arrangement of this embodiment, vibration of the gimbal portion due to baseplate or PZT excitation can be effectively suppressed in a DSA suspension comprising a slider on the gimbal portion and microactuator elements disposed on either side of the slider.

The gimbal portion of an embodiment comprises a first surface facing the load beam and a second surface opposite to the first surface, and the damper member comprises a viscoelastic material layer and a constrained plate laminated to the viscoelastic material layer, the viscoelastic material layer being secured to the first surface of the gimbal portion.

The flexure may comprise an arm portion continuous with the stationary part, a pair of first supporting portions which constitute a part of the gimbal portion supported by the arm portion and to which the first end portions of the pair of microactuator elements are secured, respectively, and a pair of second supporting portions which constitute a part of the gimbal portion and to which the second end portions of the pair of microactuator elements are secured, respectively; and the damper member may partially overlap the first supporting portions and the second supporting portions.

The tongue may comprise a first tongue portion which is formed between the pair of first supporting portions and on which a leading-side portion of the slider is disposed for movement, a second tongue portion which is formed between the pair of second supporting portions and to which a trailing-side portion of the slider is secured, and a hinge portion which is formed between the first tongue portion and the second tongue portion and contacts the dimple.

The damper member of an embodiment comprises a first damper disposed on the first tongue portion and extending transversely relative to the first tongue portion and a second damper disposed on the second tongue portion and extending transversely relative to the second tongue portion. The damper member of another embodiment comprises a first damper disposed extending longitudinally relative to one of the pair of microactuator elements and spanning between the first tongue portion and the second tongue portion and a second damper disposed extending longitudinally relative to the other microactuator element and spanning between the first tongue portion and the second tongue portion.

The damper member may comprise a circular opening which is disposed spanning between the first tongue portion and the second tongue portion and into which the dimple is fitted, in a position corresponding to the hinge portion of the damper member. The damper member may comprise a viscoelastic material layer and a constrained plate laminated to the viscoelastic material layer, the viscoelastic material layer being disposed facing openings between the first supporting portions and the second supporting portions with the microactuator elements accommodated in the openings and bonded to the viscoelastic material layer. The damper member may comprise, on a lateral part thereof, an extending portion secured to the arm portion of the gimbal portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a perspective view of a microactuator mounting section of the suspension of FIG. 3 taken from the slider;

FIG. 5 is a perspective view of the microactuator mounting section of FIG. 4 taken from the side opposite to FIG. 4;

FIG. 6 is a plan view of the microactuator mounting section of FIG. 5;

FIG. 8 is a partial sectional view of a conductive circuit portion of a flexure of the suspension;

FIG. 9 is a sectional view of the microactuator mounting section of FIG. 4;

FIG. 10 is a partial sectional view showing a load beam and gimbal portion;

FIG. 11 is a partial plan view of the flexure of the microactuator mounting section of FIG. 5;

FIG. 12 is a plan view schematically showing the microactuator mounting section with microactuator elements actuated;

FIG. 13 is a perspective view of a microactuator mounting section according to a second embodiment;

FIG. 15 is a perspective view of a microactuator mounting section according to a fourth embodiment;

FIG. 19 is a partial perspective view of a microactuator mounting section according to a sixth embodiment;

FIG. 20 is a perspective view showing how the damper member is provided on the microactuator mounting section shown in FIG. 19;

DETAILED DESCRIPTION OF THE INVENTION

A disk drive suspension according to a first embodiment will now be described with reference to FIGS. 1 to 12.

Figure 1:
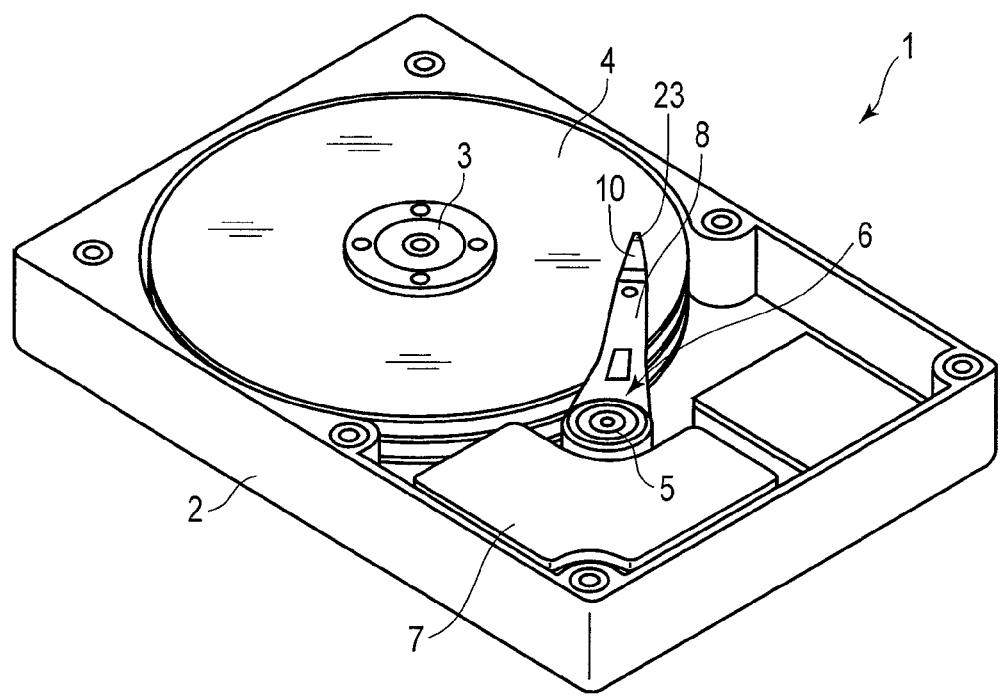
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a lid (not shown).

Figure 2:
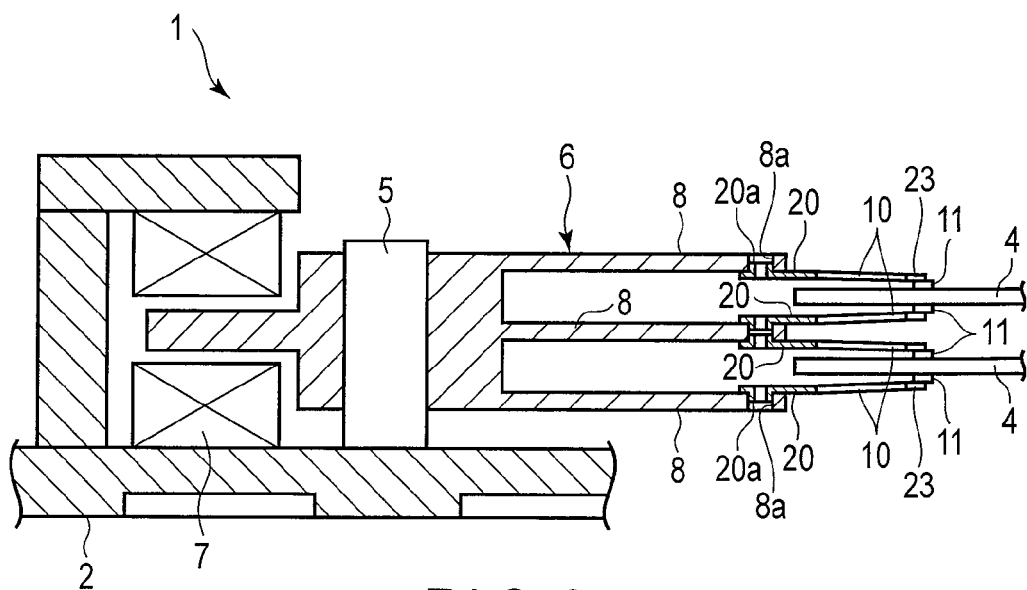
FIG. 2 is a partial sectional view of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. In a state where each disk 4 rotates at high speed, an air bearing is formed between the disk and the slider 11 as air flows in between the disk and slider.

If the carriage 6 is turned by the positioning motor 7, the suspension 10 moves radially relative to the disk 4. Thereupon, the slider 11 moves to a desired track of the disk 4.

Figure 3:
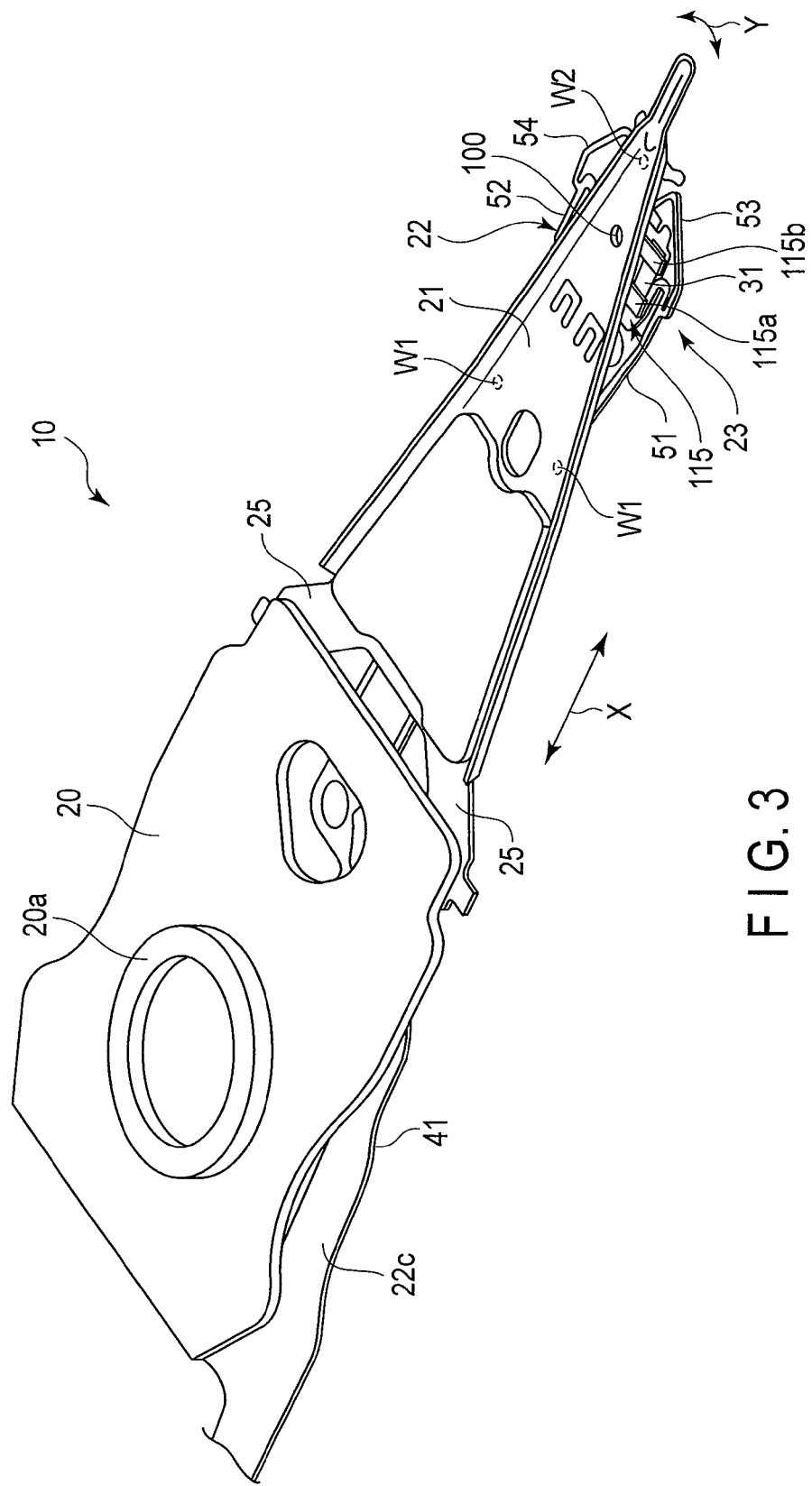
FIG. 3 is a perspective view of a suspension according to a first embodiment.

FIG. 3 shows the suspension 10 of the dual-stage-actuator (DSA) type. This suspension 10 comprises a baseplate 20 secured to its corresponding arm 8 (FIGS. 1 and 2) of the carriage 6, load beam 21, flexure 22 with conductors, microactuator mounting section 23 located near the distal end of the suspension 10, etc. A boss portion 20a to be inserted into a hole 8a (FIG. 2) in each arm 8 is formed on the baseplate 20.

In FIG. 3, arrows X and Y indicate the longitudinal direction of the load beam 21, that is, the longitudinal direction (front-rear direction) of the suspension 10, and a sway direction (transverse direction of the slider 11), respectively. Spring portions 25 capable of thicknesswise springy deformation are formed on the proximal portion (rear end portion) of the load beam 21. The flexure 22 is disposed along the load beam 21.

FIG. 4 is a perspective view of the microactuator mounting section 23 taken from the side of the slider 11. The microactuator mounting section 23 is disposed on the distal end portion of the suspension 10. Elements 28, such as magnetoresistive (MR) elements capable of conversion between magnetic and electrical signals, are disposed on an end portion of the slider 11 that constitutes the magnetic head. These elements 28 serve to access data, that is, write or read data to or from the disk 4. The slider 11, load beam 21, flexure 22, etc., constitute a head gimbal assembly.

The microactuator mounting section 23 comprises a gimbal portion 30 formed on the distal end portion of the flexure 22 and a pair of microactuator elements 31 and 32. These microactuator elements 31 and 32 are disposed individually on the opposite sides of the slider 11 on the gimbal portion 30. The microactuator elements 31 and 32 are formed of piezoelectric plates of PZT or the like and have the function of pivoting the slider 11 in the sway direction by means of a structure described in detail later.

Figure 7:
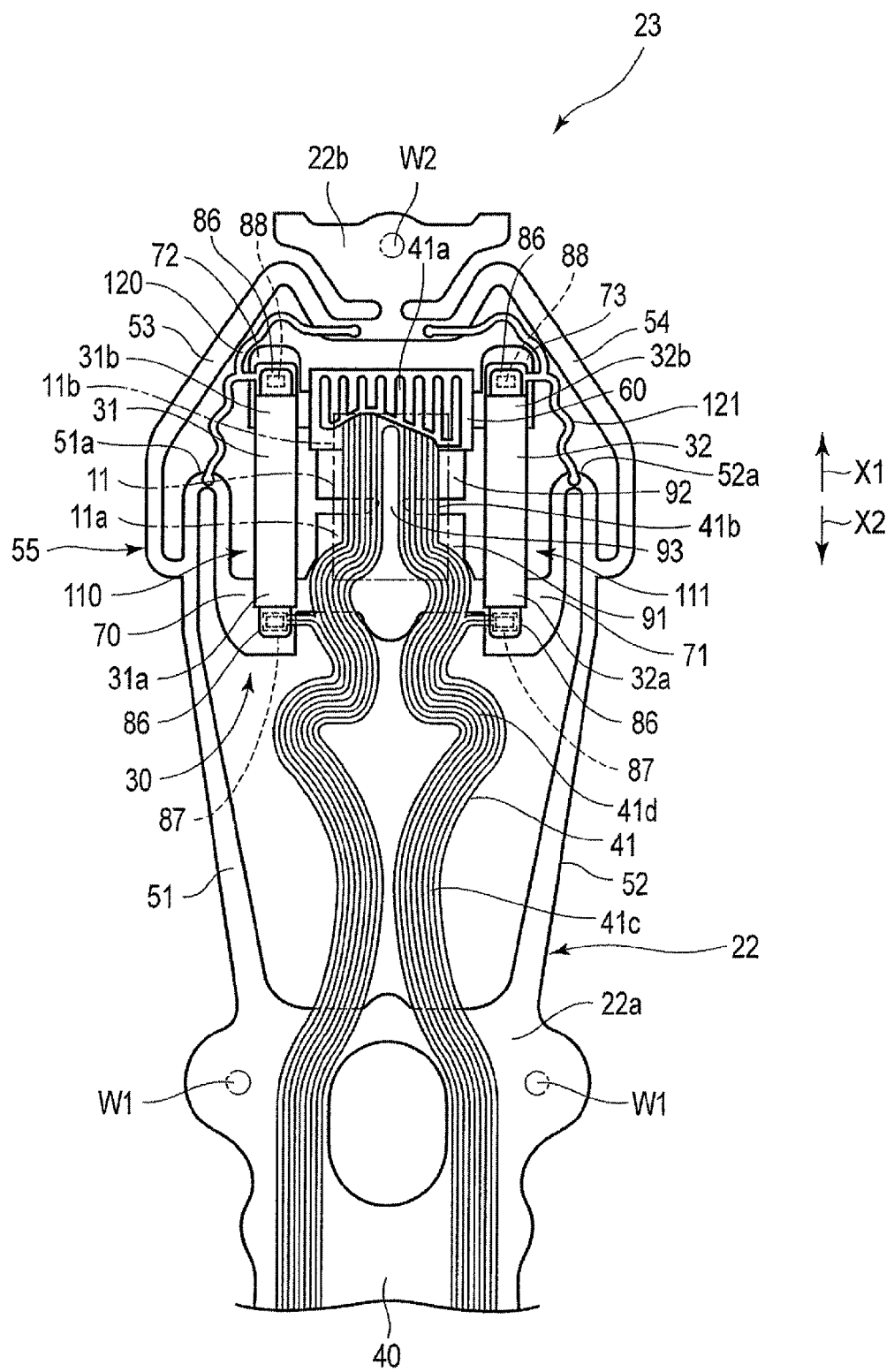
FIG. 7 is a bottom view of the microactuator mounting section of FIG. 5 taken from the side opposite to FIG. 6.

FIG. 5 is a perspective view of the gimbal portion 30 on the distal end portion of the flexure 22 and the microactuator elements 31 and 32 taken from the side opposite to FIG. 4. FIG. 6 is a plan view showing the gimbal portion 30, microactuator elements 31 and 32, etc. FIG. 7 is a bottom view of the microactuator mounting section 23 taken from the side opposite to FIG. 6.

The flexure 22 comprises a metal base 40, formed of a stainless-steel plate, and a conductive circuit portion 41. The conductive circuit portion 41 is disposed along the metal base 40. The conductive circuit portion 41 comprises a part overlapping the metal base 40 and a part not overlapping the metal base 40.

The metal base 40 is secured to the load beam 21 by fixing means, such as first welds W1 (FIGS. 3, 6, etc.) and a second weld W2 (FIGS. 3 to 7) formed by, for example, laser welding. Specifically, the flexure 22 comprises first and second stationary parts 22a and 22b. The first stationary part 22a is secured to the load beam 21 by the welds W1 at a front-rear intermediate portion of the suspension 10. The second stationary part 22b is secured to the load beam 21 by the weld W2 in a position near the distal end of the flexure 22. A rear portion 22c (FIG. 3) of the flexure 22 extends rearward from the baseplate 20.

As shown in FIGS. 5 to 7, etc., the metal base 40 of the flexure 22 comprises a pair of first arms 51 and 52 and a pair of second arms 53 and 54. The first arms 51 and 52 connect with the first stationary part 22a, and the second arms 53 and 54 with the second stationary part 22b. Respective distal end portions 51a and 52a of the first arms 51 and 52 are U-shaped. The respective rear ends of the second arms 53 and 54 are connected to the vicinity of the distal end portions 51a and 52a. The first arms 51 and 52 and second arms 53 and 54 constitute an arm portion 55 for elastically supporting the gimbal portion 30.

FIG. 8 shows an example of cross-sections of the metal base 40 and conductive circuit portion 41. The conductive circuit portion 41 comprises an insulating layer 60, write conductors 61, read conductors 62, cover layer 63, etc. The insulating layer 60 and cover layer 63 are made of an electrically insulating resin, such as polyimide. The conductors 61 and 62 are formed on the insulating layer 60. The write and read conductors 61 and 62 are electrically connected to the elements 28 of the slider 11 (FIG. 4). By way of example, the thickness of the metal base 40 is 20 μm (12 to 25 μm); that of the insulating layer 60, 10 μm (5 to 20 μm); that of each of the conductors 61 and 62, 9 μm (4 to 15 μm); and that of the cover layer 63, 5 μm (2 to 10 μm). The thickness of the metal base 40 is smaller than that (e.g., 30 μm) of the load beam 21.

The pair of microactuator elements 31 and 32 are disposed on the gimbal portion 30 of the flexure 22. The gimbal portion 30 of this embodiment comprises a first surface 30a (FIGS. 5 and 10) facing the load beam 21 and a second surface 30b (FIGS. 4 and 10) opposite to the first surface 30a. A damper member 115 (described later) is disposed on the first surface 30a. The slider 11 and microactuator elements 31 and 32 are disposed on the second surface 30b.

The microactuator elements 31 and 32 comprise first end portions 31a and 32a and second end portions 31b and 32b, respectively. Arrows X1 and X2 in FIGS. 4, 6 and 7 indicate forward and rearward directions, respectively, with respect to the microactuator elements 31 and 32. The first end portions 31a and 32a of the microactuator elements 31 and 32 are secured to a pair of first supporting portions 70 and 71, respectively, formed on the gimbal portion 30. The first supporting portions 70 and 71 connect with the first stationary part 22a of the flexure 22 through the flexible first arms 51 and 52, respectively. The distal end portions 51a and 52a of the first arms 51 and 52 connect with the second stationary part 22b of the flexure 22 through the second arms 53 and 54, respectively. Thus, the first supporting portions 70 and 71 of the gimbal portion 30 are supported on the stationary parts 22a and 22b by the arm portion 55 (comprising the first arms 51 and 52 and second arms 53 and 54) that can be elastically deformed relative to the load beam 21. The second end portions 31b and 32b of the microactuator elements 31 and 32 are secured to second supporting portions 72 and 73, respectively, of the gimbal portion 30.

FIG. 9 shows a cross-section of a joint portion that mechanically secures and electrically connects the end portions 31a and 31b of the one microactuator element 31. Since a joint portion at the end portions 32a and 32b of the other microactuator element 32 is constructed in the same manner as that shown in FIG. 9, the one microactuator element 31 will be representatively described below.

As shown in FIG. 9, the microactuator element 31 comprises a PZT element 80 and first and second electrodes 81 and 82 formed on the peripheral surface of the PZT element 80. The first electrode 81 is formed ranging from one end surface of the PZT element 80 to the upper surface thereof. The second electrode 82 is formed ranging from the other end surface of the PZT element 80 to the lower surface thereof. The first end portion 31a of the microactuator element 31 is secured to the first supporting portion 70 of the gimbal portion 30 by an electrically insulating adhesive block 85. The second end portion 31b of the microactuator element 31 is secured to the second supporting portion 72 by another adhesive block 85.

The first electrode 81 shown in FIG. 9 conducts to a conductor 87 of the conductive circuit portion 41 through an electrically conductive paste (e.g., silver paste) 86 on the first supporting portion 70. The second electrode 82 conducts to a ground-side conductor 88 through another electrically conductive paste 86 on the second supporting portion 72. The ground-side conductor 88 is secured to and conducts to the metal base 40.

As shown in FIGS. 5, 6, etc., the gimbal portion 30 of the flexure 22 comprises a tongue 90. The tongue 90 comprises a first tongue portion 91 on the stationary side, second tongue portion 92 on the movable side, and hinge portion 93 formed between the tongue portions 91 and 92. The first tongue portion 91 is formed between the pair of first supporting portions 70 and 71, and the second tongue portion 92 between the pair of second supporting portions 72 and 73. The hinge portion 93 is formed between the first and second tongue portions 91 and 92. The supporting portions 70 to 73, tongue portions 91 and 92, and hinge portion 93 all constitute a part of the metal base 40, and their respective contours are formed by, for example, etching. The first and second tongue portions 91 and 92 and hinge portion 93 constitute the tongue 90 configured to carry the slider 11 thereon.

As shown in FIG. 7, the conductive circuit portion 41 branches left and right and extends above the first and second tongue portions 91 and 92. Terminals 41a for the slider 11 are formed on the distal end of the conductive circuit portion 41. These terminals 41a conduct to the conductors 61 and 62 of the conductive circuit portion 41. Further, the terminals 41a are electrically connected to the elements 28 of the slider 11 (FIG. 4). The conductors 87 for the microactuator elements 31 and 32 are provided individually on the left- and right-hand sides of the conductive circuit portion 41. The conductors 87 are connected to the respective electrodes 81 of the microactuator elements 31 and 32 on the first supporting portions 70 and 71, individually.

The conductive circuit portion 41 comprises a first wiring pattern portion 41b disposed between the microactuator elements 31 and 32 and a second wiring pattern portion 41c extending rearward relative to the gimbal portion 30 from the first wiring pattern portion 41b. A curved portion 41d is formed at a longitudinal part of the second wiring pattern portion 41c, whereby the rigidity of that part of the conductive circuit portion 41 between the first arms 51 and 52 is reduced.

FIG. 10 is a partial sectional view of the load beam 21 and gimbal portion 30 taken at the location of the hinge portion 93. FIG. 11 is a plan view of the gimbal portion 30, a part of the flexure 22. Width L1 of the hinge portion 93 is sufficiently smaller than width L2 of each of the first and second tongue portions 91 and 92. Slits 94 and 95 are formed between the tongue portions 91 and 92 on the opposite sides of the hinge portion 93, individually. The tongue portions 91 and 92 are relatively pivotably connected together by the narrow hinge portion 93. Thus, the second tongue portion 92 on the movable side is configured to move relative to the first tongue portion 91 on the stationary side in the directions indicated by arrows A and B in FIG. 11.

The slider 11 is disposed on the first and second tongue portions 91 and 92. Further, a leading-side portion 11a of the slider 11 is disposed for movement relative to the first tongue portion 91. A trailing-side portion 11b of the slider 11 is secured to the second tongue portion 92. The "leading side" stated herein is the side where air flows in between the slider 11 and disk 4 as the disk rotates. On the other hand, the "trailing side" is the side where air between the slider 11 and disk 4 comes out. The hinge portion 93 is formed in the center of the slider 11, e.g., the center of gravity of the slider 11 or the center thereof with respect to both transverse and longitudinal directions.

A convex dimple 100 (FIG. 10) is formed near the distal end of the load beam 21. The dimple 100 is an example of a supporting protrusion and comprises a convex surface projecting toward the first surface 30a of the gimbal portion 30. The top of the convex surface (or the tip of the dimple 100) abuts the hinge portion 93. Specifically, the hinge portion 93 is swingably supported by the tip of the dimple 100. Thus, the gimbal portion 30 is supported for swinging motion relative to the load beam 21 about a point of contact P1 between the hinge portion 93 and the tip of the dimple 100.

Alternatively, a dimple may be formed on the hinge portion 93 such that its tip abuts the load beam 21. In short, the convex dimple should only be formed on one of the respective facing surfaces of the load beam 21 and hinge portion 93 so that its tip abuts the other facing surface.

As shown in FIG. 11, etc., an opening 110 is formed between the first and second supporting portions 70 and 72 on the right-hand side of FIG. 11. The opening 110 communicates with the one slit 94. Also, an opening 111 is formed between the first and second supporting portions 71 and 73 on the left-hand side of FIG. 11. The opening 111 communicates with the other slit 95.

Since the openings 110 and 111 are thus formed on the opposite sides of the tongue portions 91 and 92, respectively, front-rear intermediate portions of the microactuator elements 31 and 32 can be prevented from contacting the tongue portions 91 and 92. If the suspension 10 is subjected to external mechanical shock, therefore, the front-rear intermediate portions of the elements 31 and 32 can be prevented from being struck by the tongue portions 91 and 92. Thus, the elements 31 and 32 can be prevented from being damaged by being struck.

The microactuator mounting section 23 comprises the damper member 115. The damper member 115 is attached to the first surface 30a of the metal base 40 of the gimbal portion 30. The damper member 115 of the present embodiment comprises first and second dampers 115a and 115b. The dampers 115a and 115b comprise a viscoelastic material layer 116 and constrained plate 117, respectively.

The viscoelastic material layer 116 is made of a polymeric material (e.g., acrylic resin), which can exhibit a viscous resistance corresponding to its degree of elastic deformation, and has some liquidity and viscosity. The constrained plate 117 is made of a synthetic resin, such as polyimide, and is laminated in the thickness direction of the viscoelastic material layer 116. Thickness T (FIG. 10) of the damper member 115 is smaller than projection height H (e.g., 50 to 70 μm) of the dimple 100. If projection height H of the dimple 100 is, for example, 60 μm, thickness T of the damper member 115 is 50 μm. The thicknesses of the viscoelastic material layer 116 and constrained plate 117 are, for example, 25 μm each.

As shown in FIGS. 5 and 6, the first and second dampers 115a and 115b are disposed on the first and second tongue portions 91 and 92, respectively. The dampers 115a and 115b are, for example, rectangular. The dampers 115a and 115b are disposed parallel to each other and perpendicular to longitudinal direction X of the load beam 21 (or transversely relative to the tongue 90). While the dampers 115a and 115b are individually secured to the metal base 40 of the gimbal portion 30 by the adhesive force of the viscoelastic material layer 116, they may alternatively be secured to the metal base 40 with an adhesive (not shown).

The first and second dampers 115a and 115b are disposed in such positions that they do not overlap the dimple 100 on the first surface 30a of the gimbal portion 30. The first damper 115a is partially disposed on the first supporting portions 70 and 71, and the second damper 115b partially disposed on the second supporting portions 72 and 73. The hinge portion 93 is exposed between the dampers 115a and 115b. The dimple 100 (FIG. 10) contacts the hinge portion 93 at the point of contact P1.

The microactuator mounting section 23 of the present embodiment comprises limiter members 120 and 121. As shown in FIGS. 4 and 7, the one limiter member 120 is connected to the distal end portion 51a of the first arm 51, second arm 53, and second supporting portion 72. The other limiter member 121 is connected to the distal end portion 52a of the first arm 52, second arm 54, and second supporting portion 73.

The limiter members 120 and 121 have the function of keeping the tongue portions 91 and 92 from excessively shaking or the hinge portion 93 from moving away from the dimple 100 (dimple separation) if the suspension 10 is subjected to external mechanical shock. The limiter members 120 and 121 are made of an electrically insulating resin, such as polyimide, shared with the insulating layer 60 (FIGS. 8 and 9) of the conductive circuit portion 41, and are crimped so that they do not interfere with the motion of the microactuator elements 31 and 32 in operation.

The following is a description of the operation of the suspension 10 of the present embodiment.

If the carriage 6 (FIGS. 1 and 2) is turned by the positioning motor 7, the suspension 10 moves radially relative to the disk 4. Thereupon, the slider 11 of the magnetic head moves to a desired track of the recording surface of the disk 4. If a voltage is applied to the microactuator elements 31 and 32, the microactuator elements 31 and 32 are oppositely distorted relative to each other. In this way, the load beam 21 can be moved by an infinitesimal distance in the sway direction (indicated by arrow Y in FIG. 3).

As schematically shown in FIG. 12, for example, the second tongue portion 92 moves in the direction of arrow A as the one and the other microactuator elements 31 and 32 contract and extend, respectively. Thus, the elements 28 (FIG. 4) on the slider 11 can be quickly precisely positioned in the sway direction. Actually, the movement distance of the slider 11 in the sway direction ranges from several nm to several tens of nm. In FIG. 12, however, the degree of deformation of the gimbal portion 30 is exaggeratedly indicated for better understanding of the movements of the slider 11 and second tongue portion 92.

In the microactuator mounting section 23 of the present embodiment, the second tongue portion 92 on the movable side pivots transversely relative to the slider 11 about the hinge portion 93, with respect to the first tongue portion 91 on the stationary side, if the microactuator elements 31 and 32 are actuated. The trailing-side portion 11b of the slider 11 is secured to the second tongue portion 92. In contrast, the leading-side portion 11a of the slider 11 is movable relative to the first tongue portion 91. As shown in FIG. 10, the tip of the dimple 100 abuts the hinge portion 93 at the point of contact P1.

If the microactuator elements 31 and 32 are actuated by application of a voltage, therefore, the second tongue portion 92 and slider 11 pivot about the point of contact P1 with the dimple 100. Thus, the pivot center of the slider 11 can be matched with the position of the contact point P1 of the dimple 100. In this way, the tip of the dimple 100 can be kept from rubbing against the flexure 22 when the microactuator elements 31 and 32 are actuated (or when the slider 11 is pivoted). Thus, production of high frictional resistance or a causative agent of contamination during the pivoting motion of the second tongue portion 92 can be suppressed.

In addition, the microactuator elements 31 and 32 are disposed on the second surface 30b of the gimbal portion 30 on the same side as the slider 11. Therefore, the thickness of each of the microactuator elements 31 and 32 need not be made smaller than the projection height of the dimple 100. Accordingly, thick structures can be used for the microactuator elements 31 and 32. Thus, the available microactuator elements 31 and 32 provide high output load and mechanical strength and are hard to break.

The microactuator mounting section 23 of the present embodiment comprises the damper member 115 on the gimbal portion 30, and the viscoelastic material layer 116 of the damper member 115 adheres to the metal base 40. Since the viscoelastic material layer 116 has some liquidity and viscosity, it is displaced together with the metal base 40 and constrained plate 117 that vibrate when energy to cause the gimbal portion 30 to vibrate is input. If the viscoelastic material layer 116 is deformed, internal resistance is produced by friction between molecules that constitute the viscoelastic material layer 116, and vibrational energy of the constrained plate 117 and the like is converted into thermal energy. In this way, the viscoelastic material layer 116 can suppress the vibration of the gimbal portion 30 and reduce resonance gain.

FIG. 13 shows a microactuator mounting section 23A according to a second embodiment. The microactuator mounting section 23A of this embodiment is slightly different from the microactuator mounting section 23 of the first embodiment in the arrangement of first and second dampers 115a and 115b. The first damper 115a of this microactuator mounting section 23A is disposed extending longitudinally relative to a microactuator element 31, one of a pair of microactuator elements 31 and 32, and spanning between first and second tongue portions 91 and 92. The second damper 115b is disposed extending longitudinally relative to the other microactuator element 32 and spanning between the tongue portions 91 and 92. The dampers 115a and 115b are disposed substantially parallel to each other so that a hinge portion 93 is exposed between the dampers 115a and 115b. The dimple 100 (FIG. 10) contacts the hinge portion 93 at a point of contact P1. Since other configurations and effects are common to the microactuator mounting sections 23 and 23A of the first and second embodiments, common numbers are used to designate common portions of the first and second embodiments, and a description of those portions is omitted.

Figure 14:
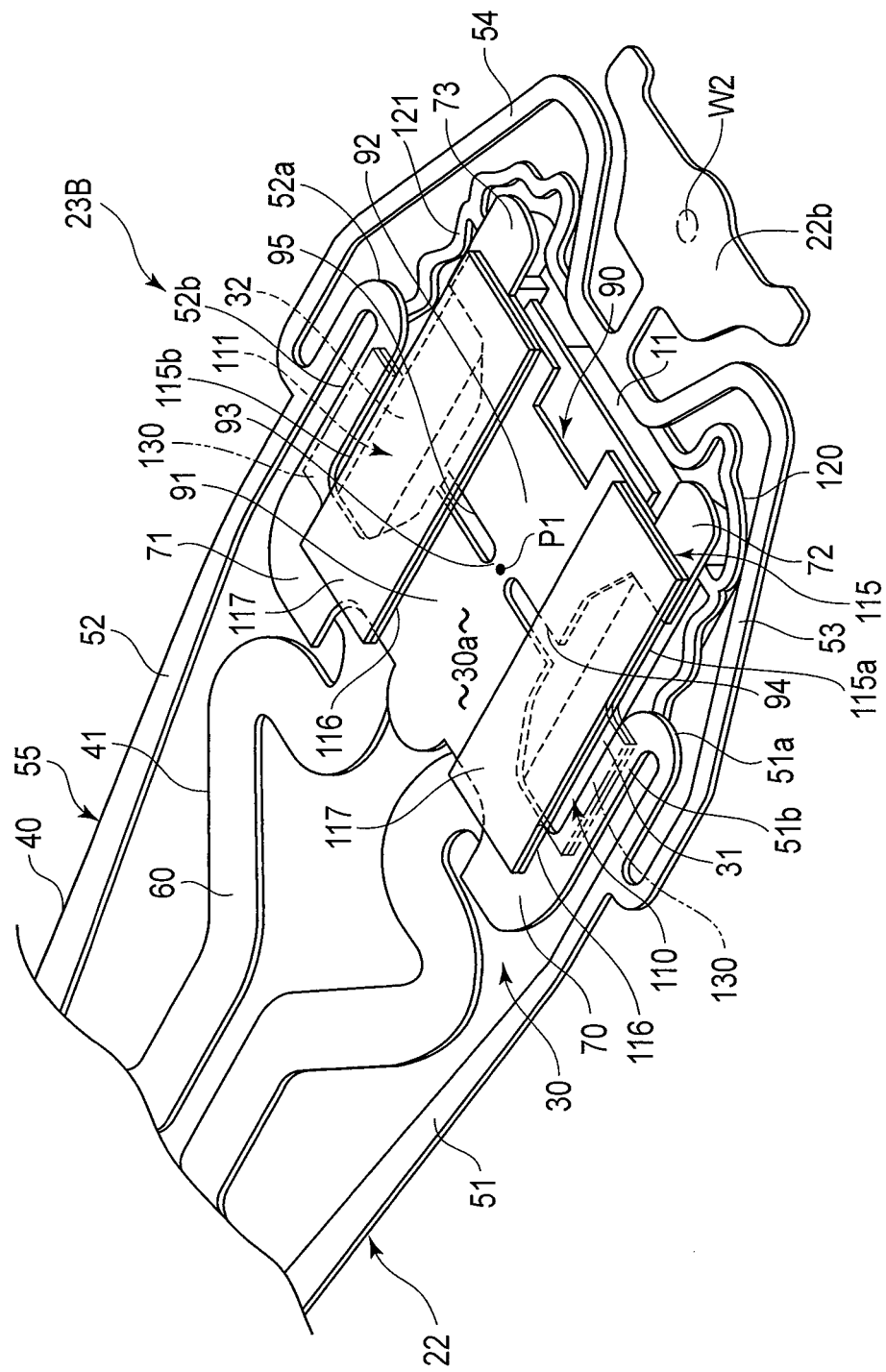
FIG. 14 is a perspective view of a microactuator mounting section according to a third embodiment.

FIG. 14 shows a microactuator mounting section 23B according to a third embodiment. The dampers 115a and 115b of this embodiment are wider than those of the microactuator mounting section 23A of the second embodiment (FIG. 13). Specifically, the first damper 115a is sufficiently large to substantially cover an opening 110 between first and second supporting portions 70 and 72. The second damper 115b is sufficiently large to substantially cover an opening 111 between first and second supporting portions 71 and 73. Alternatively, extending portions 130 may be formed individually on respective lateral parts of the first and second dampers 115a and 115b so that they overlap low-rigidity portions 51b and 52b (which have little influence on gimbal motion) near the distal ends of arms 51 and 52. Since other configurations and effects are common to the microactuator mounting sections 23A and 23B of the second and third embodiments, common numbers are used to designate common portions of the second and third embodiments, and a description of those portions is omitted.

FIG. 15 shows a microactuator mounting section 23C according to a fourth embodiment. A damper member 115 of this embodiment is disposed spanning between tongue portions 91 and 92 and supporting portions 70 and 71. The damper member 115 is formed with a circular opening 140 into which the dimple 100 (FIG. 10) is fitted, in a position corresponding to a hinge portion 93. Since other configurations and effects are common to the microactuator mounting sections 23, 23A 23B and 23C, common numbers are used to designate common portions, and a description of those portions is omitted.

Figure 16:
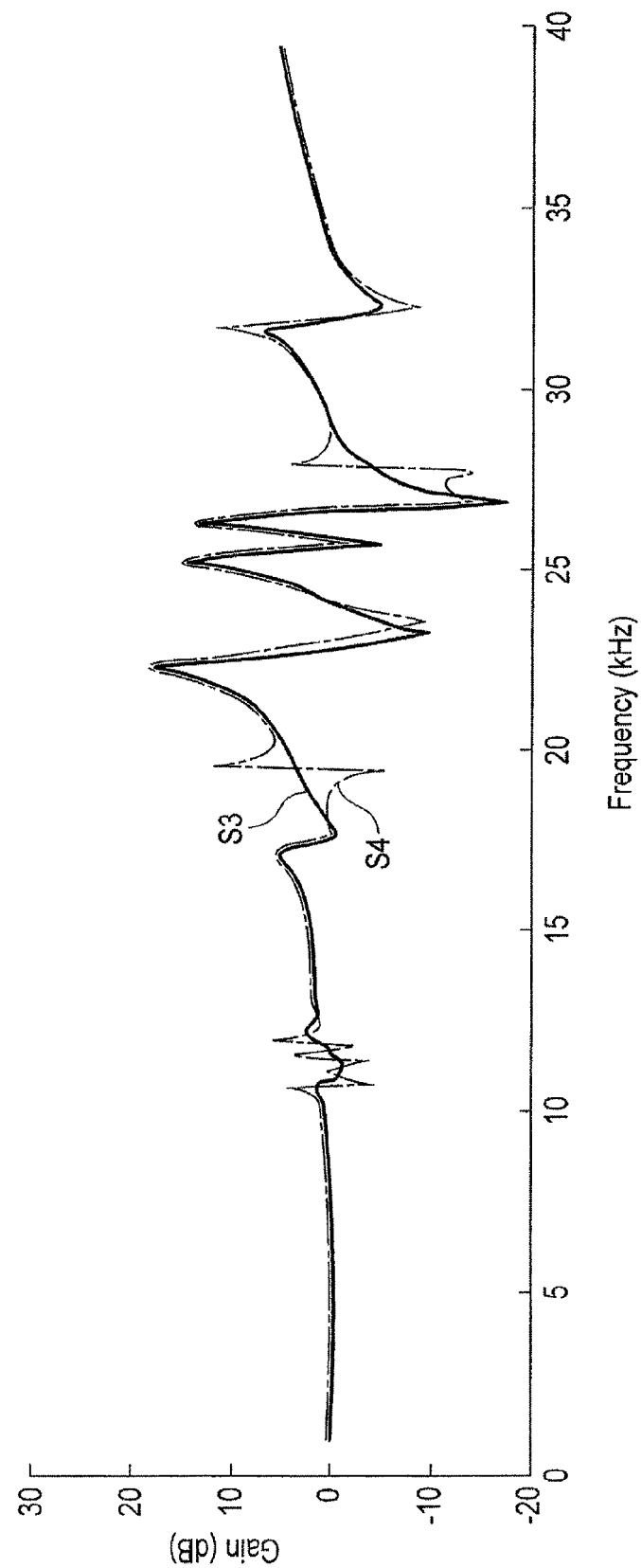
FIG. 16 is a graph showing respective frequency response characteristics of the microactuator mounting section comprising a damper member shown in FIG. 15 and a microactuator mounting section without a damper member.

FIG. 16 shows frequency response characteristics based on PZT excitation of the microactuator mounting section comprising the damper member 115 shown in FIG. 15 and a microactuator mounting section without a damper member. In FIG. 16, full line S3 represents a frequency response characteristic curve of the microactuator mounting section comprising the damper member 115. Dash-dotted line S4 represents a frequency response characteristic curve of the damper-less microactuator mounting section. In the microactuator mounting section with the damper member 115, compared with the damper-less microactuator mounting section, the gain is suppressed in torsional modes near 12 kHz, 20 kHz, etc.

Figure 17:
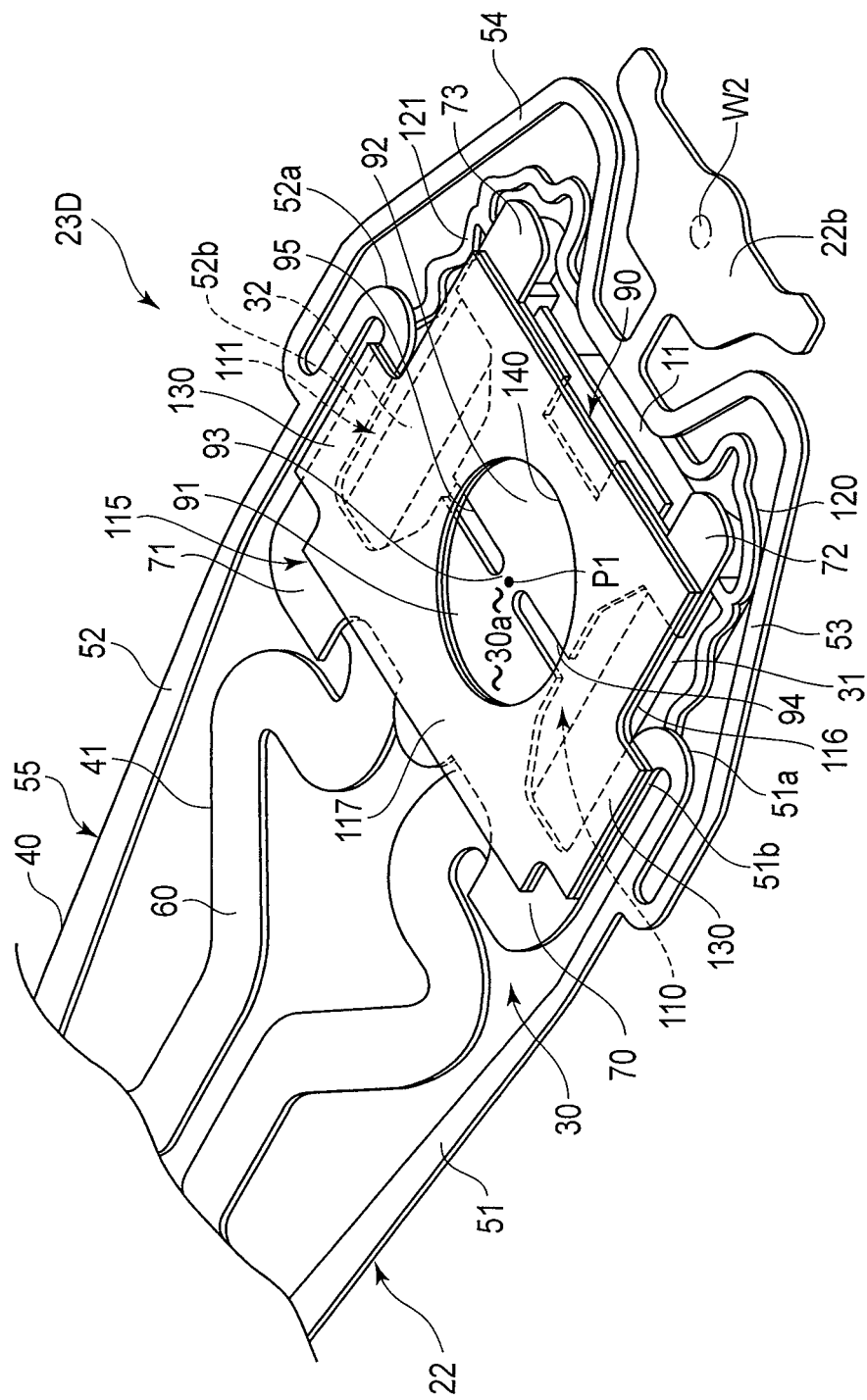
FIG. 17 is a perspective view of a microactuator mounting section according to a fifth embodiment.

FIG. 17 shows a microactuator mounting section 23D according to a fifth embodiment. Extending portions 130 are formed individually on the opposite side portions of a damper member 115 of this embodiment. These extending portions 130 overlap low-rigidity portions 51b and 52b (which have little influence on gimbal motion) near the distal ends of arms 51 and 52. Since other configurations and effects are common to the microactuator mounting sections 23C (FIG. 15) and 23D of the fourth and fifth embodiments, common numbers are used to designate common portions of the fourth and fifth embodiments, and a description of those portions is omitted.

Figure 18:
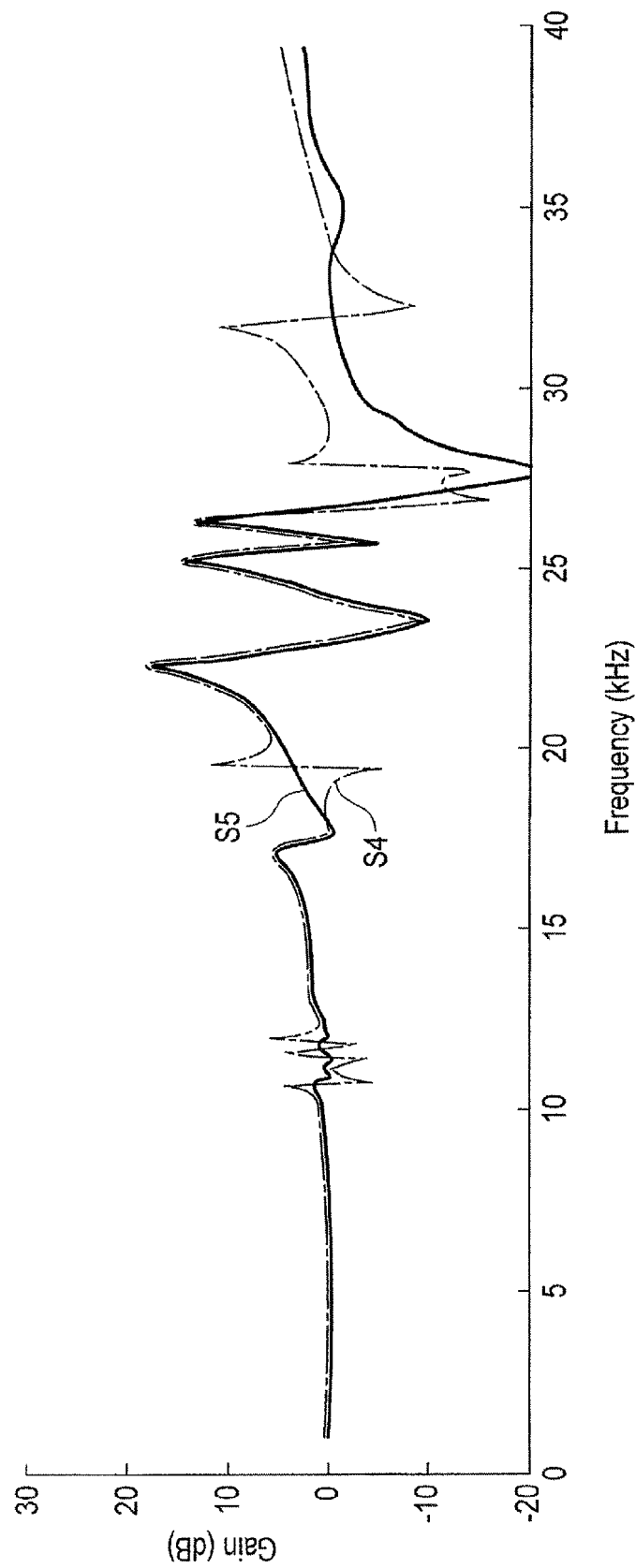
FIG. 18 is a graph showing respective frequency response characteristics of the microactuator mounting section comprising the damper member shown in FIG. 17 and a microactuator mounting section without a damper member.

FIG. 18 shows frequency response characteristics based on PZT excitation of the microactuator mounting section comprising the damper member 115 shown in FIG. 17 and a microactuator mounting section without a damper member. In FIG. 18, full line S5 represents a frequency response characteristic curve of the microactuator mounting section comprising the damper member 115. Dash-dotted line S4 represents the frequency response characteristic curve of the damper-less microactuator mounting section. In the microactuator mounting section with the damper member 115, compared with the damper-less microactuator mounting section, the gain is suppressed in torsional modes near 12 kHz, 20 kHz, etc.

FIGS. 19 to 22 show a part of a microactuator mounting section 23E according to a sixth embodiment, that is, that part where a microactuator element 32, one of a pair of microactuator elements, is located. That part where the other microactuator element is located is constructed in the same manner.

Figure 21:
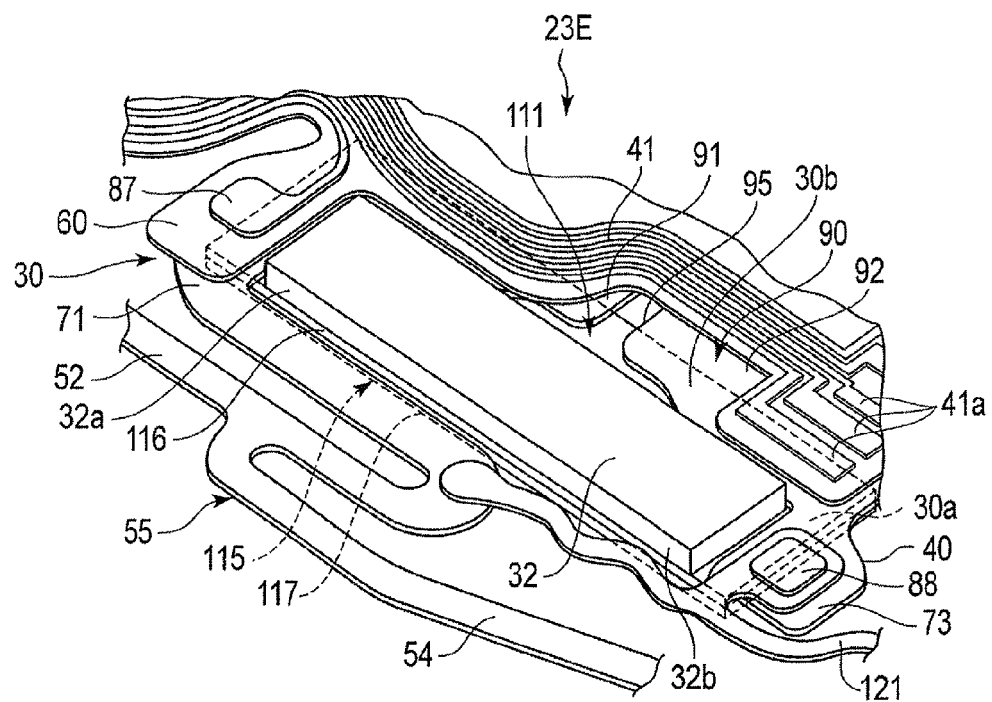
FIG. 21 is a perspective view showing how a microactuator element is disposed on the microactuator mounting section shown in FIG. 20.

As shown in FIG. 19, an opening 111 is formed between first and second supporting portions 71 and 73 of a tongue 90 of a gimbal portion 30. The opening 111 is sufficiently large to accommodate the microactuator element 32 (FIG. 21). As shown in FIG. 20, a damper member 115 is secured to a first surface 30a of the gimbal portion 30 from below the opening 111 with a viscoelastic material layer 116 facing the opening 111.

As shown in FIG. 21, the microactuator element 32 is fitted into the opening 111 and placed on the viscoelastic material layer 116. This microactuator element 32 is secured to the damper member 115 by the adhesive force of the viscoelastic material layer 116. Further, opposite end portions 32a and 32b of the microactuator element 32 are secured to the first and second supporting portions 71 and 73, respectively, with an electrically insulating adhesive (not shown).

Figure 22:
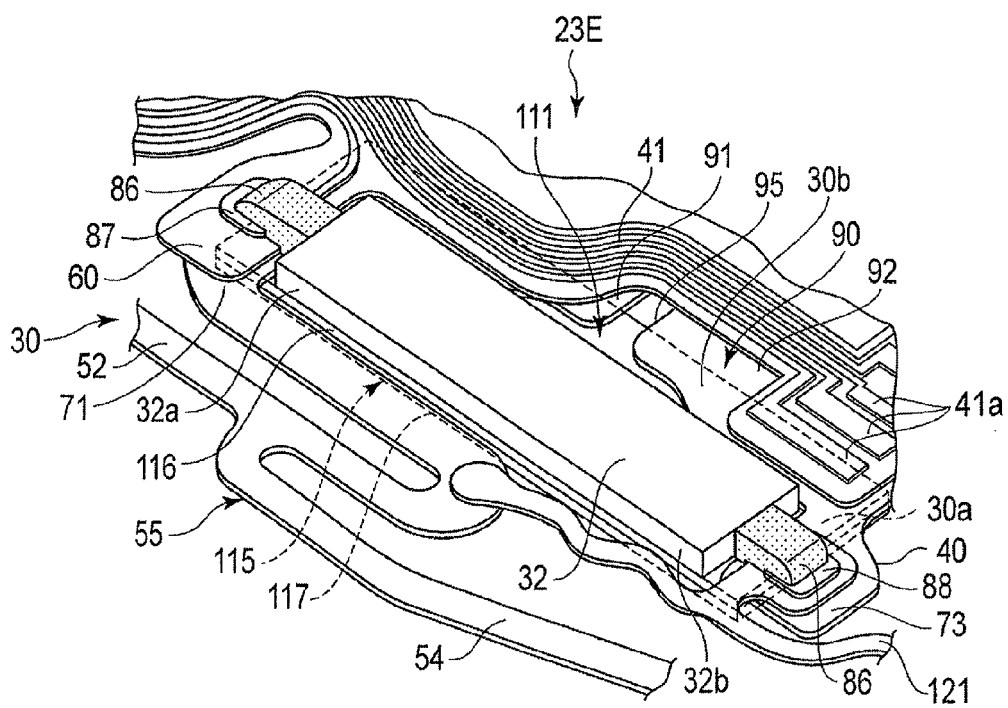
FIG. 22 is a perspective view showing how an electrically conductive paste is provided on the microactuator element shown in FIG. 21.
Figure 23:
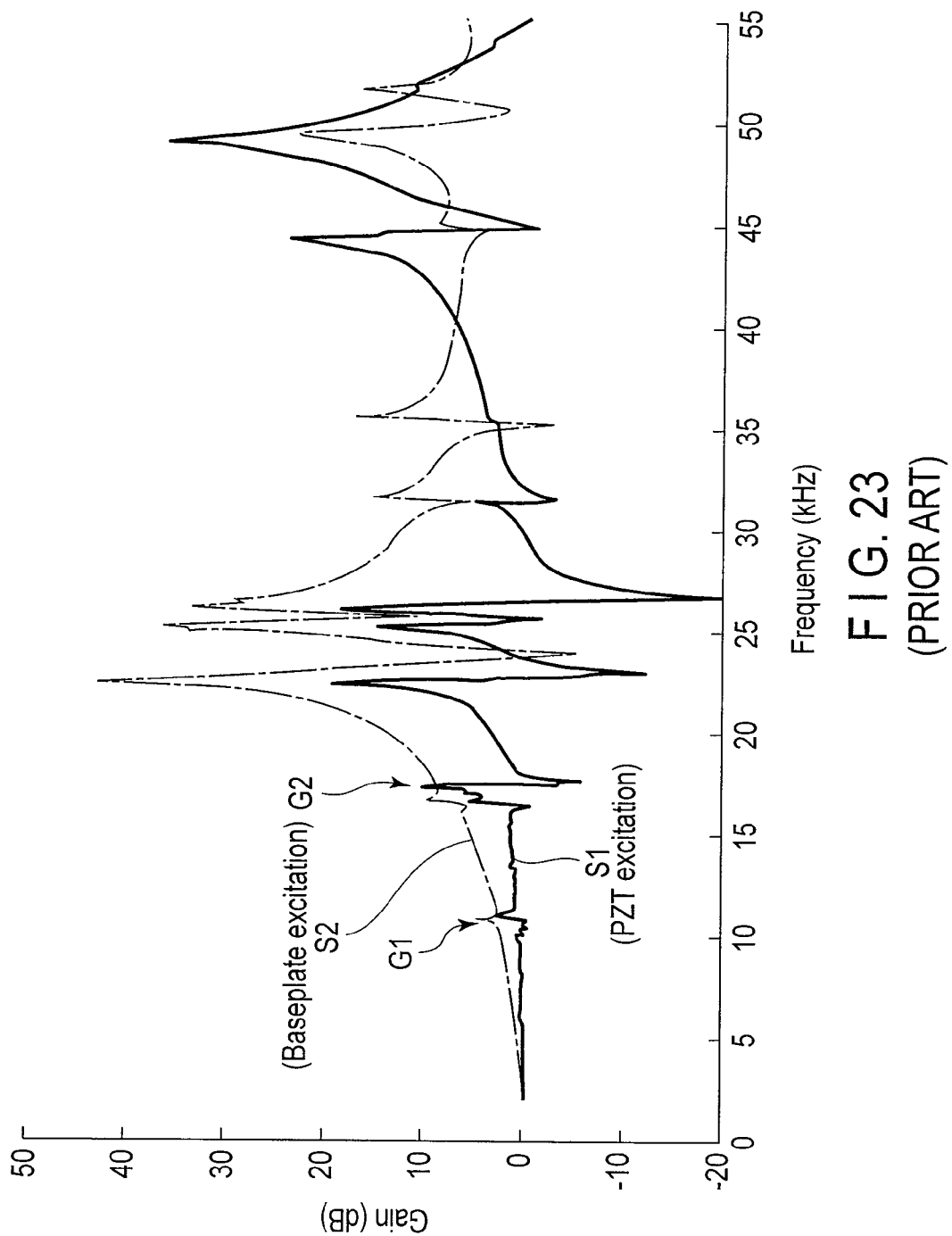
FIG. 23 is a graph showing frequency response characteristics of a microactuator mounting section of a conventional suspension.

As shown in FIG. 22, moreover, the first end portion 32a of the microactuator element 32 and a conductor 87 are electrically connected to each other by an electrically conductive paste 86, such as silver paste. Further, the second end portion 32b of the microactuator element 32 and a ground-side conductor 88 are electrically connected to each other by the electrically conductive paste 86. If the microactuator element 32 is bonded to the viscoelastic material layer 116 of the damper member 115, as in this embodiment, the gain of torsional mode M of the frequency response characteristics shown in FIGS. 16 and 18 can be further reduced. Other configurations and effects are common to the microactuator mounting sections 23A (FIG. 13), 23B (FIG. 14) and 23E of the second, third, and sixth embodiments.

It is to be understood, in carrying out the present invention, that the specific forms of the constituent elements of the microactuator mounting section, including the shapes, layouts, etc., of the damper member and microactuator elements, may be modified variously. For example, both the transversal dampers 115a and 115b shown in FIG. 6 and the longitudinal dampers 115a and 115b shown in FIG. 13 may be provided on the gimbal portion 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension which comprises a load beam and a flexure comprising a stationary part and a gimbal portion, the disk drive suspension further comprising:
    a tongue on which a slider is mounted;
    a pair of microactuator elements, each microactuator element being disposed on a respective side of the slider and comprising a first end portion and a second end portion;
    a convex dimple formed on one of respective facing surfaces of the load beam and the tongue and configured to contact the other facing surface, thereby supporting the tongue for a swinging motion relative to the load beam; and
    a damper member disposed on the gimbal portion at a position away from the dimple,
    wherein the flexure comprises a pair of first supporting portions to which the first end portions of the pair of microactuator elements are respectively secured, and a pair of second supporting portions to which the second end portions of the pair of microactuator elements are respectively secured, and
    wherein the damper member comprises portions which overlap the first supporting portions and the second supporting portions.

2. The disk drive suspension of claim 1, wherein the gimbal portion comprises a first surface facing the load beam and a second surface opposite to the first surface, and the damper member comprises a viscoelastic material layer and a constrained plate laminated to the viscoelastic material layer, the viscoelastic material layer being secured to the first surface of the gimbal portion.

3. The disk drive suspension of claim 1, wherein the flexure comprises an arm portion continuous with the stationary part, the pair of first supporting portions which constitute a part of the gimbal portion supported by the arm portion, and the pair of second supporting portions which constitute a part of the gimbal portion.

4. The disk drive suspension of claim 2, wherein the flexure comprises an arm portion continuous with the stationary part, the pair of first supporting portions which constitute a part of the gimbal portion supported by the arm portion, and the pair of second supporting portions which constitute a part of the gimbal portion.

5. The disk drive suspension of claim 3, wherein the tongue comprises a first tongue portion which is formed between the pair of first supporting portions and on which a leading-side portion of the slider is disposed for movement, a second tongue portion which is formed between the pair of second supporting portions and to which a trailing-side portion of the slider is secured, and a hinge portion which is formed between the first tongue portion and the second tongue portion, is narrower than the tongue portions, and comprises a point of contact with the dimple.

6. The disk drive suspension of claim 4, wherein the tongue comprises a first tongue portion which is formed between the pair of first supporting portions and on which a leading-side portion of the slider is disposed for movement, a second tongue portion which is formed between the pair of second supporting portions and to which a trailing-side portion of the slider is secured, and a hinge portion which is formed between the first tongue portion and the second tongue portion, is narrower than the tongue portions, and comprises a point of contact with the dimple.

7. The disk drive suspension of claim 5, wherein the damper member comprises a first damper disposed on the first tongue portion and extending transversely relative to the first tongue portion and a second damper disposed on the second tongue portion and extending transversely relative to the second tongue portion.

8. The disk drive suspension of claim 6, wherein the damper member comprises a first damper disposed on the first tongue portion and extending transversely relative to the first tongue portion and a second damper disposed on the second tongue portion and extending transversely relative to the second tongue portion.

9. The disk drive suspension of claim 5, wherein the damper member comprises a first damper disposed extending longitudinally relative to a first one of the pair of microactuator elements and spanning between the first tongue portion and the second tongue portion and a second damper disposed extending longitudinally relative to a second one of the pair of microactuator elements and spanning between the first tongue portion and the second tongue portion.

10. The disk drive suspension of claim 6, wherein the damper member comprises a first damper disposed extending longitudinally relative to a first one of the pair of microactuator elements and spanning between the first tongue portion and the second tongue portion and a second damper disposed extending longitudinally relative to a second one of the pair of microactuator elements and spanning between the first tongue portion and the second tongue portion.

11. The disk drive suspension of claim 5, wherein the damper member is disposed spanning between the first tongue portion and the second tongue portion and comprises a circular opening into which the dimple is fitted, in a position corresponding to the hinge portion of the tongue.

12. The disk drive suspension of claim 6, wherein the damper member is disposed spanning between the first tongue portion and the second tongue portion and comprises a circular opening into which the dimple is fitted, in a position corresponding to the hinge portion of the tongue.

13. The disk drive suspension of claim 5, wherein the damper member comprises a viscoelastic material layer and a constrained plate laminated to the viscoelastic material layer, the viscoelastic material layer being disposed facing openings between the first supporting portions and the second supporting portions with the microactuator elements accommodated in the openings and bonded to the viscoelastic material layer.

14. The disk drive suspension of claim 6, wherein the viscoelastic material layer is disposed to face openings between the first supporting portions and the second supporting portions with the microactuator elements being accommodated in the openings and bonded to the viscoelastic material layer.

15. The disk drive suspension of claim 1, wherein the damper member comprises, on a lateral part thereof, an extending portion secured to an arm portion of the gimbal portion.

* * * * *